United States Patent [19]

Miller et al.

[11] Patent Number: 5,031,098
[45] Date of Patent: Jul. 9, 1991

[54] TRANSACTION CONTROL SYSTEM INCLUDING PORTABLE DATA TERMINAL AND MOBILE CUSTOMER SERVICE STATION

[75] Inventors: Phillip Miller; Steven E. Koenck; George E. Hanson; Roger L. Wolf, all of Cedar Rapids, Iowa

[73] Assignee: Norand Corporation, Cedar Rapids, Iowa

[21] Appl. No.: 345,146

[22] Filed: Apr. 28, 1989

[51] Int. Cl.$^5$ ............................................. G07G 1/14
[52] U.S. Cl. ................................................. 364/405
[58] Field of Search ................ 364/401, 405; 235/472, 235/383, 2, 7 R

[56] References Cited

U.S. PATENT DOCUMENTS

| | | | |
|---|---|---|---|
| 4,115,870 | 9/1978 | Lowell | 364/900 |
| 4,247,908 | 1/1981 | Lockhart, Jr. et al. | 364/900 |
| 4,280,034 | 7/1981 | Ezaki et al. | 235/10 |
| 4,530,067 | 7/1985 | Dorr | 364/900 |
| 4,569,421 | 2/1986 | Sandstedt | 186/39 |
| 4,672,377 | 6/1987 | Murphy et al. | 340/825.34 |
| 4,676,343 | 6/1987 | Humble et al. | 186/61 |
| 4,713,760 | 12/1987 | Yamada et al. | 364/405 |
| 4,775,928 | 10/1988 | Kendall et al. | 364/200 |
| 4,893,237 | 1/1990 | Unno | 364/405 |

FOREIGN PATENT DOCUMENTS

| | | | |
|---|---|---|---|
| 3331495 | 3/1985 | Fed. Rep. of Germany | 364/405 |
| 0119772 | 9/1980 | Japan | 364/408 |
| 0110172 | 9/1981 | Japan | 364/405 |
| 0166573 | 12/1981 | Japan | 364/405 |
| 0121473 | 7/1983 | Japan | 364/401 |
| 0178576 | 10/1984 | Japan | |
| 0072062 | 4/1985 | Japan | 364/709.12 |
| 2119988 | 11/1983 | United Kingdom | 364/405 |
| 2196766 | 5/1988 | United Kingdom | 364/401 |

Primary Examiner—Jerry Smith
Assistant Examiner—David Huntley
Attorney, Agent, or Firm—Neuman, Williams, Anderson & Olson

[57] ABSTRACT

A mobile customer service station includes a console on a wheeled chassis. The console carries and houses a number of components which are used in merchandising operations to conclude customer purchase transactions. The items supported externally on the console are a printer for printing purchase receipts, customer credit charge agreements and records of transactions, and a magnetic card reader for reading information from a magnetic stripe of a customer's credit card. The console further includes a cash drawer. The operation of the printer, credit card reader and the cash drawer is controlled by a multi-function control unit located within an enclosure of the console. The control unit is electrically powdered by a self-contained power source which is preferably a deep cycle rechargeable battery. The console also houses a transceiver unit which under the control of the control unit is capable of interactive communication with a radio communication system. The radio communications system is controlled by a central computer and includes a plurality of portable data terminals which are coded to individually communicate with the central computer. The infusion of the customer service station into the radio communications system allows the data terminals to become data entry units for the mobile customer service station. The self-contained power source and the transceiver permit the customer service station to be moved to merchandising locations of temporary peak customer activity without the expense or time requirements of first having to install electrical services.

19 Claims, 4 Drawing Sheets

TRANSACTION CONTROL SYSTEM INCLUDING PORTABLE DATA TERMINAL AND MOBILE CUSTOMER SERVICE STATION

BACKGROUND OF THE INVENTION

1. Field of the Invention

This invention relates generally to a computer controlled data terminal system and more particularly to an interactive data terminal system including portable radio data terminals which are used in merchandising operations and interface by radio transmissions with a central data processing unit.

2. Description of the Prior Art

The general acceptance of computers has brought about profound advances to retail business operations. Cash registers have been enhanced with digital scales and with bar code readers. The enhanced cash registers have been coupled to computers thus becoming sophisticated and efficiently functioning point-of-sales equipment. The enhancements have resulted in a reduction of time requirements for processing customers at check-out counters in comparison with those of more traditional check-out procedures of the recent past.

Beyond applications increasing efficiency at the check-out counter, the power of computers has been applied to track sales trends and to generate real-time data for re-stocking merchandise inventories. A tight control over inventories allows inventory margins to be optimized with resulting inventory cost optimization.

Inventory stock control further has benefited from the portability of well-known hand-held data terminals which are coupled via radio frequency transmissions into a communications network coupled to a central computer. Such hand-held data terminals equipped with bar code scanners are used to update shelf inventory data and match existing shelf items with computer back-up and pricing information. Systems using such hand-held data terminals are currently in wide-spread use in retail stores because of their convenience of providing input of inventory data directly from stock areas to the computer, thereby replacing tedious inventory list comparisons with streamlined scanner counts and computerized comparisons.

The concept of hand-held order terminals has also been disclosed with respect to restaurant or retail vending apparatus in which a portable data terminal is carried by a waiter or order taker. The portable terminal can be paged from a customer station, such as a restaurant table, to allow a customer to call the waiter assigned to that table. The waiter then uses the unit to take the order of the customer and transfers the completed order by radio link to an order processing station in the kitchen of the restaurant and to a central processing station. The central processing station is directly connected to a cash register. Thus, when the customer is ready to leave, the customer's bill has already been processed by the central processing station and is available at the cash register.

The latter system pre-complies the bill for services rendered to a customer, thereby reducing a typical delay at the check-out counter. Other systems seek to reduce delays at check-out counters by bar code reading to key information on articles purchased into the cash register and to permit the computer to provide the pricing and total billing information. However, in spite of these recent advancements in the art, there will be a continued need for detailed attention to identify and record individual customer purchases. The store needs records of purchases to correctly charge a customer's account, and the customer needs a record of purchases for item return or warranty purposes, for example. Hence waiting lines at check-out counters during peak hours are still part of our lifestyles. There continues to exist a need to further improve the efficiencies of retail business systems.

SUMMARY OF THE INVENTION

In seeking to serve such current need, the present invention provides new and improved uses for portable hand-held terminals. Certain features of the invention are intended as an expansion of currently existing systems using such hand-held terminals. The use of the invention in currently existing systems imparts to such systems an adaptability to changes in demand for customer service. Increased customer activity and associated peak demands for customer service may be seasonal in nature or may be sudden in response to promotional activities in certain departments of a merchandise retail store. The invention addresses needs created by increased customer activities, may they be seasonal or a result of special sales promotions. The invention also seeks to defocus customer services that are typically performed at check-out counters. Such defocusing is expected to reduce a current problem of customers having to wait for extensive periods in line for service at check-out counters.

These and other improvements and advantages are realized by providing a mobile customer service station for checking out customer purchases. The station includes apparatus, such as a transceiver, for interacting with a central computer, and apparatus for generating a record of purchases made by a customer and for charging a customer's account in accordance with customer-indicated payment preferences. The mobile customer service station further includes a self-contained power source, such as a rechargeable battery. The self-contained power source powers the apparatus for interacting with the central computer, the apparatus for generating a purchase record and for charging the customer's account according to payment preferences.

In a particular aspect of the invention, the mobile customer service station includes apparatus for identifying a customer and charging purchases made by the customer to the customer's account, apparatus for receiving cash payment and for selectively charging a customer's account according to customer-expressed payment preferences, and apparatus for providing the customer with a receipt for the completed transaction. Such apparatus is powered by a self-contained power source, such as a rechargeable battery and housed by an enclosure. The enclosure is mounted to a mobile base chassis and is adapted to be moved on demand from any one current location to any second location of relatively higher customer service demands than such current location.

In a specific embodiment of the invention, the mobile customer service station includes a credit card reader, a receipt and charge slip printer, and a cash drawer, all of which are linked to and controlled by a multi-function control unit. In a more specific embodiment the mobile customer service station further includes a keyboard, a digital readout and a bar code reader. These elements are mounted to a frame or to support members of said enclosure. The multi-function control unit is also located in, and mounted to a frame member within, the enclosure. The multi-function control unit is electrically and communicatively coupled to, and controls the operation of, such elements as the credit card reader, the receipt and charge slip printer and the cash drawer.

BRIEF DESCRIPTION OF THE DRAWING

Various features and advantages of the invention are best understood when the Detailed Description below is read in reference to the appended drawings comprised of the following.

DETAILED DESCRIPTION

Figure 1:
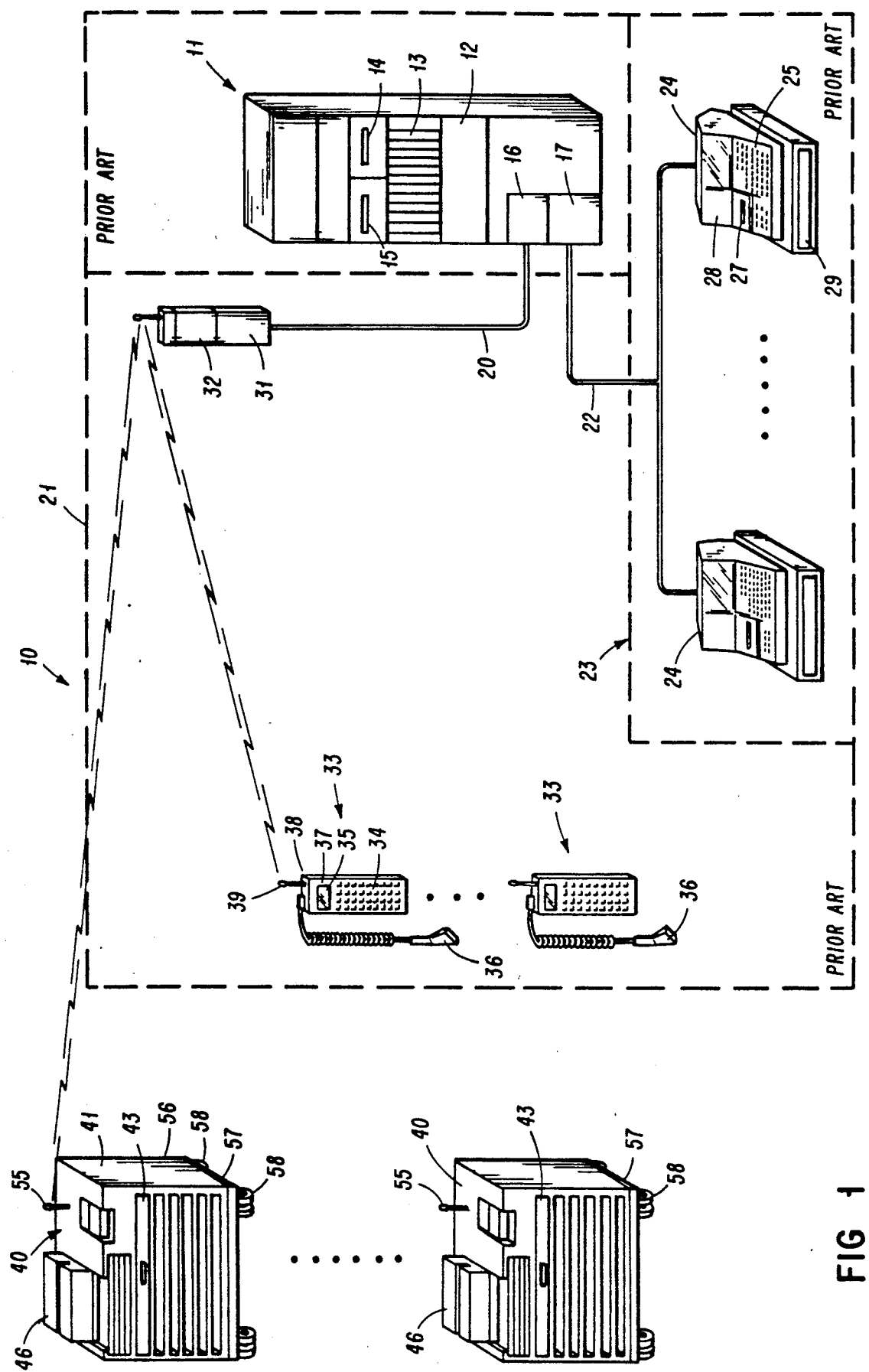
FIG. 1 is a schematic representation of a transaction control system showing features of the present invention including a combination of portable data entry terminal units and mobile customer service stations communicatively coupled to a transceiver base station.

FIG. 1 shows a transaction control system designated generally by the numeral 10. The transaction control system 10 is comprised of certain subsystems. A central data processing station or central computer 11 is the major functional control subsystem of the system 10. Computers are well-known in the art and typically include such sub-units as a microprocessor functioning as a central processing unit 12, electronic data storage such as memory 13 and more permanent data storage as is found in magnetically stored digital data storage apparatus such as a disk drive 14 or a tape drive 15. The computer 11 communicates its processed data or control information via interface buffers and ports 16 and 17 to other subsystems in accordance with its intended function.

FIG. 1 shows the central computer 11 being communicatively connected via a cable 20 to a wireless communications system, such as a radio communication system 21 and via a cable 22 to a customer service subsystem 23. In case of a retailing operation the customer service subsystem 23 may, for example, be a specific subsystem in which a plurality of customer service stations 24 are typical cash registers. The cash registers are individually linked to the central computer 11 to receive from the computer 11 instructions and information, such as current pricing of specific items of merchandise. In the preferred embodiment of FIG. 1, the customer service subsystem 23 includes more generally a plurality of customer service stations 24 each of which is hard-wired via the cable 22 to the central computer 11. Typically such customer service station includes a keyboard 25, a digital readout 26, a card reader 27, a receipt printer 28 and a typical cash drawer 29.

In operating the customer service subsystem 23 as a typical point-of-sale subsystem, sales clerks are checking out merchandise items at their respective stations 24 for customers who have completed shopping and are ready to pay for selected merchandise items. One typical mode of operation with respect to the station 24 is for a sales clerk to enter, via the keyboard 25, respective S.K.U. (Stock Keeping Unit) numbers of merchandise items selected by the customer. The central computer 11 then looks up in its banks of memory 13 the price of each respective merchandise item and communicates the price to the respective station 24. Information inputs by the sales clerk regarding the quantity of the items purchased by the customer may be processed locally at the station 24 or by the computer 11. At the end of the check-out procedure prices of items purchased are totaled, and the customer is presented with a bill. Cash or credit payment choices are interactively communicated to the computer 11.

The described system of computer interactive checkout on cash registers 24 has been further improved by the use of the radio communication system 21. The radio communication system 21 includes in particular a communications controller 31 which is preferably hard-wired through the cable 20 directly to the computer 11. The communications controller 31 is communicatively coupled to a base transceiver station 32. The communications controller 31 has what is typically referred to as multiplexing capability, namely an ability to receive a series of uniquely addressed data and data messages in digital format by serial transfer from the computer 11. The communications controller converts such digital data messages to typical time-slot coded radio messages which are uniquely addressed according to the instructions from the computer. The radio messages are then transferred or applied to the base transceiver station 32 to be transmitted by radio frequency. Radio messages transmitted from the base transceiver station 32 are capable of being received by any of a number of data terminals 33. However, in a radio communications system such as the system 21, each of the data terminals 33 has the capability to uniquely decode only that portion of the data and data messages which is uniquely addressed to the respective terminal 33 by the unique address code assigned to that particular terminal 33. Therefore, of an entire multiplexed coded message transmitted by the base transceiver 32 only that portion of the message which is directed to a particular one of the data terminals 33 is decoded by and only by that one terminal 33. Conversely, digital data and a combination of data and non-data characters forming a data message, as encoded by such particular data terminal 33 are uniquely identifiable by the communications controller 31 as having been originated by that particular terminal 33. The unique addressing and identification functions reside in coding and decoding circuits of typical multiplexing systems.

Figure 2:
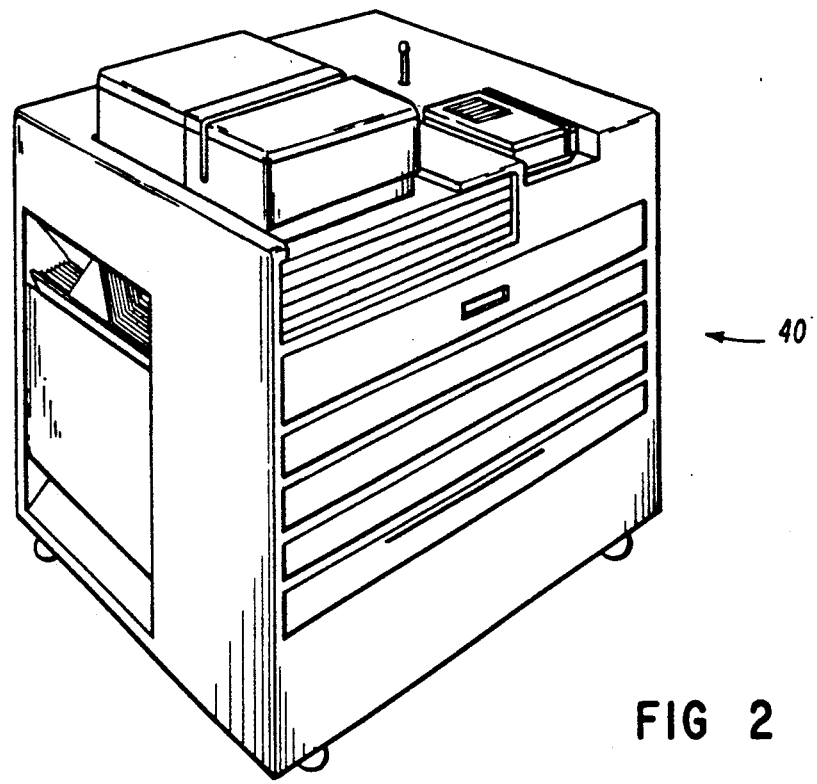
FIG. 2 shows is a pictorial representation of a mobile customer service station referred to with respect to FIG. 1.

In typical radio communications systems 21 each of the data terminals 33 preferably includes a keyboard 34, a data message display or digital readout 35 and a bar code reader 36. The data terminals further include a memory 37 for storing data and data messages. Because of special space considerations in such hand-held units as the data terminals 33, the various communications, transmitting and receiving circuits are integrated, thereby allowing the size of the data terminal 33 to remain of a size which allows the terminal to be conveniently carried about by a clerk. The integrated transmitting, receiving, coding and decoding circuits within the data terminal 33 are referred to collectively as a transceiver terminal unit 38. The sole externally visible element of the transceiver terminal unit 38 is seen in FIGS. 1 and 2 as an externally visible antenna 39.

A major distinction between the typical transceiver terminal unit 38 and the combination of the communications controller 31 and the base transceiver station 32, as already mentioned, lies in their message addressing functions. The communications controller 31 has the ability to communicate with any and all of the terminal units 33 by encoding digital data messages by time-slot encoding and directing a digital data message to selected specific ones of a plurality of the data terminals 33, as such terminals may have been designated as the intended receiver by the computer 11. In contrast each of the transceiver terminal units 38 of the data terminals 33 are not capable of communicating with each other, but only with the communications controller 31. Thus each transceiver terminal unit 38 uniquely identifies and decodes only that portion of a received message which is specifically addressed to its respective data terminal 33.

A physical separation between the communications controller 31 and the base transmitter station 32 increases the serviceability of the radio communications system 21. If, for example, a transmission or reception problem occurs within the circuitry of the base transceiver station, the base transceiver station 32 being a distinct unit is easily removed from the communication controller 31. The removed unit is then readily replaced by a substitute base transceiver station 32 operating on the same frequency. Such a replacement minimizes down time of the system 21, generally. On the other hand, the data terminals 33, being hand-held units, are preferably kept small in size. The small size is more convenient for units intended to be carried about, and should one of the data terminals 33 ever malfunction, it is easily replaced by substituting another terminal 33 operating on the same time-slot coding as the defective one. Consequently the advantage of separating the coding and decoding circuits from the transmitter and receiver circuits does not exist.

A number of commercial sources are currently offering systems suitable for use as the radio communications system 21. A preferred communications system 21 is a Model NT2200 radio system, sold by Norand Corporation, the assignee hereof. The preferred system functions in a time-slot multiplexing mode which permits up to sixteen data terminals 33 to be polled by the communications controller 31.

The communications system 21, enhanced in accordance with this invention as shown in FIG. 1, includes at least one mobile customer service station designated generally by the numeral 40. Typically, more than one of the mobile customer service stations 40 may be employed, as indicated schematically in FIG. 1. However, a preferred method of using the customer service station 40 in conjunction with a plurality of the data terminals 33 limits in practice the number of customer service stations 40 which may be used conveniently within the capacity of any one of the radio communications systems 21.

Figure 3:
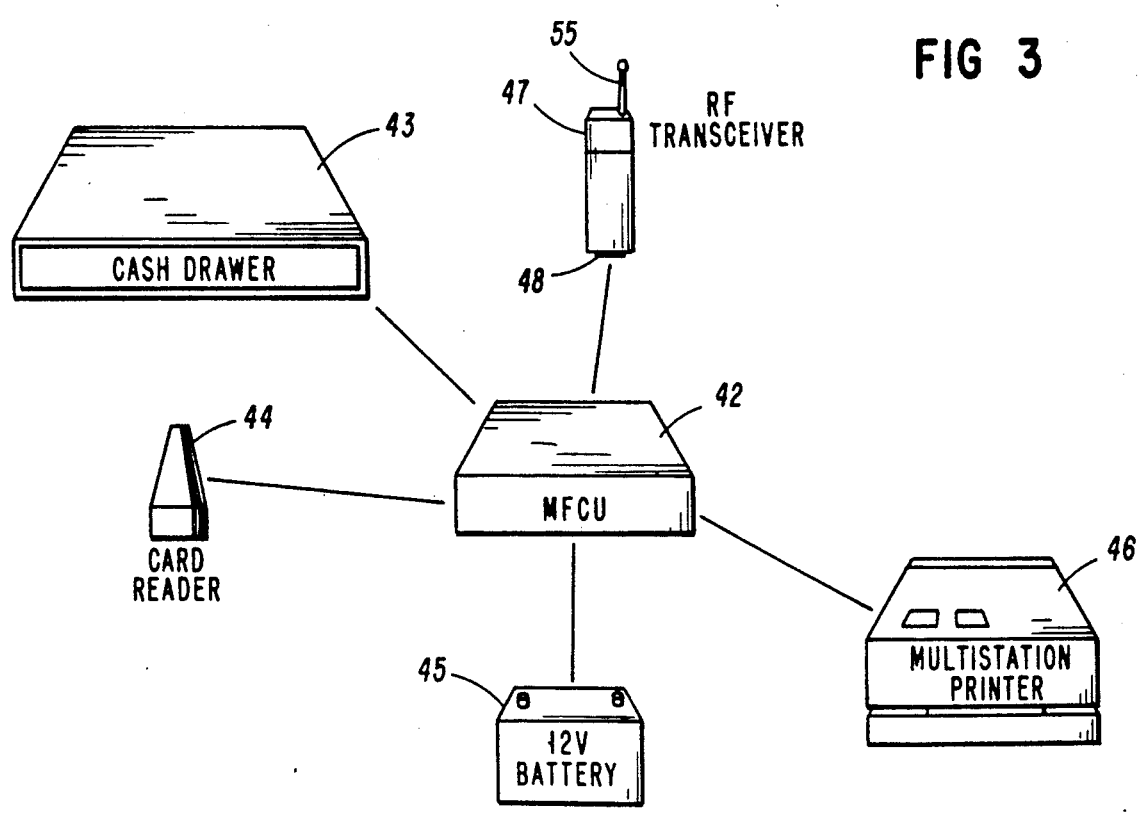
FIG. 3 is a schematic representation of features of the preferred embodiment of the invention, showing particularly elements housed in or mounted to the mobile enclosure of the mobile customer service station shown in FIG. 2.

A description of major elements of the customer service station 40 will permit a better understanding of how the customer service station 40 may be used within the radio communications system 21, and what are the preferred modes of using the customer service station in conjunction with the radio communications system 21. FIG. 2 depicts the general appearance of a console 41 and the overall arrangement of significant and preferred components and elements of the mobile customer service station 40. FIG. 3 shows schematically major components of one embodiment of the customer service station 40.

A multi-function control unit 42 ("MFCU"), provides local control functions for the customer service station 40 and provides radio communications, as for example with the communications controller 31 in FIG. 1. In the preferred embodiment the customer service station 40 further includes a cash drawer 43 which, of course, is used for storing cash and customer-signed credit authorizations. A card reader 44 allows a customer's credit card information to be read when a customer has selected to charge payments for purchased items to a credit card account. Typically credit cards contain magnetic stripes bearing magnetically encoded information relating to the customer. Data read by the card reader consequently may include the card number, an account number, possibly account status information, and such data may furthermore include a personal identification of the user. These data need to be interpreted. According to the preferred embodiment the card reader is a model 40 Magstripe reader, as sold by American Magnetics. Of course, other readers may be equally feasible. The reader is not contemplated to include circuitry for the interpretation of data read from a card. Instead, the interpretation of data read from a card will be performed by the control unit 42.

A self-contained power source, such as a rechargeable battery 45 is contemplated to power all electrical functions of the customer service station 40 for the duration of each contemplated period of usage to permit the customer service station to maintain the mobility or independence of customer service station 40 from conventional power outlets. It should be realized that, alternatively, mobile electronic equipment may be powered by transformer-type power supplies in temporary substitutions for batteries. Such alternate power sources typically do not require extensive hard wiring of the equipment to which they are applied. Thus, within the intent of this invention such alternate power sources are somewhat self-contained and should be considered to lie within the realm of reasonable changes and modifications within the scope of the invention. The battery is preferred to be a 12 volt deep cycle type battery. Depending on the type of usage of the equipment contemplated to be included as part of the customer service station 40, the battery size is selected to fully power all selected functions for the duration of the longest contemplated period of usage. The correctly selected battery size will allow the battery 45 to be charged during idle periods, such as during store closing hours. The customer service station 40 will then be ready for use during the following business day.

A printer 46 is selected for low power usage in support of the mobility of the customer service station. The printer is intended to print customer receipts and may be used to print customer credit authorizations to be retained by the store. A printer typically is a mechanical motion device requiring more power for its operation than other, non-motion devices, such as computers or the card reader 44, for instance. A multi-station printer, commercially available from NCR Corporation as Model 7150, has been selected as satisfying low power requirements deemed necessary for operating the customer service station 40 essentially as a mobile unit.

A radio transceiver 47 functions as a transmitting and receiving unit for the mobile customer service station 40. In a preferred embodiment of the customer service station 40, the transmitting and receiving functions of the transceiver 47 are separated from the functions of encoding and decoding radio messages. The transmitting and receiving functions are separately housed in the transceiver 47 itself, while the coding and decoding functions reside in and are part of the multi-function control unit 42, similar to the separation of the base transceiver station 32 and the communications controller 31. A connector 48 is located at the base of the transceiver 47 for electrically coupling the transceiver 47 to the multi-function control unit 42. Thus, in such preferred embodiment the radio transceiver 47 is like the base transceiver station 32 of the radio communications system 21, such that the two units are interchangeable. The radio transceiver is coupled to the multi-function control unit 42 which performs all communications functions within the customer service station 40 other than the functions of receiving and transmitting radio messages.

Figure 4:
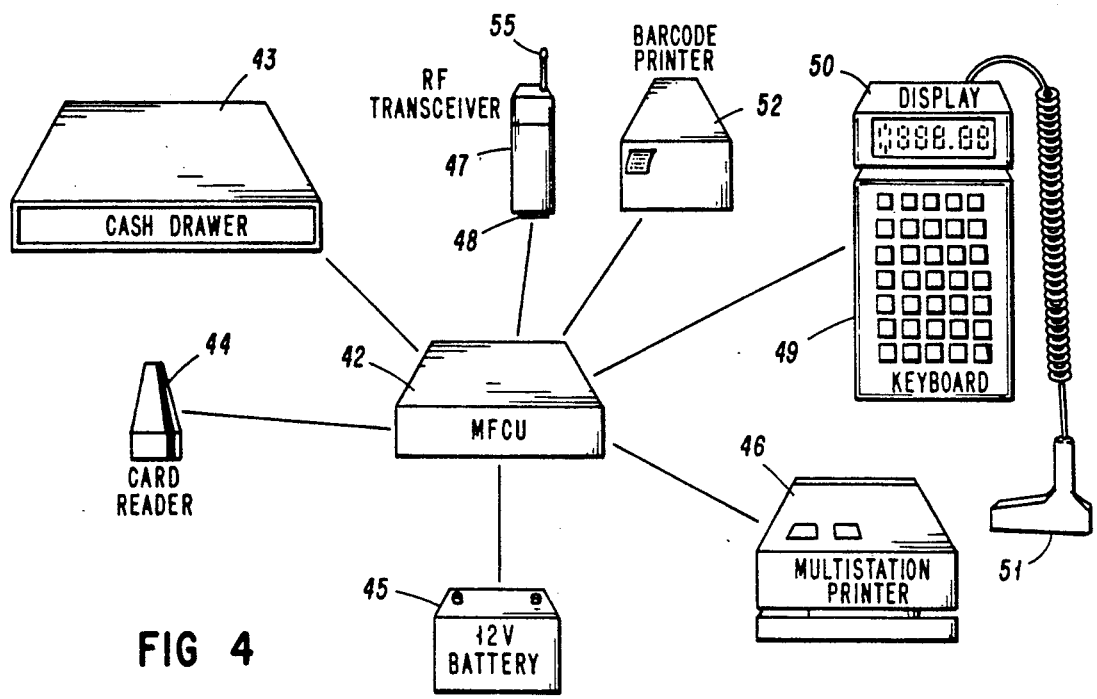
FIG. 4 is a schematic representation of features of an alternate embodiment of the invention, showing in addition to the preferred elements of FIG. 3 additional elements which may be desirable for an expanded scope of the invention.

An alternate embodiment of the mobile customer service station 40 is shown in FIG. 4. In addition to the components described with respect to the preferred embodiment of the customer service station 40, the alternative embodiment thereof further includes a keyboard 49, a display 50, such as a typical video screen, liquid crystal or an LED display with alphanumerical character modes, and a bar code reader 51. A bar code printer 52, also shown in the alternate embodiment of FIG. 4 may be desirable for providing certain customer service functions different from the typical function of tallying purchased items in a standard check-out operation.

The keyboard 49 is preferred to be an alphanumeric keyboard for entering computer queries and customer information in addition to typical SKU numbers. The display 50 is coupled to the keyboard 49 and to the multi-function control unit 42 and is consequently capable of showing data received from either the keyboard 49 or the control unit 42. The data communication connection between the control unit 42 and the display 50 is bi-directional, thereby providing for interactive communication between an operator of the keyboard 49 via the display 50 with the multi-function control unit 42. In this interactive mode the control unit 42 reads data from the display 50 or from the keyboard 49, and has the capability to output data or information to the display 50. The bar code reader 51 is preferably coupled to the display 50, and data read by the bar code reader 51, for example, from merchandise identification tags or from customer courtesy cards or the like, are stored and displayed by the display 50. The multi-function control unit 42 has, of course, access to data stored in the display 50 through the referred-to bi-directional data link between the control unit 42 and the display 50.

The bar code printer 52 is a typical, commercially available bar code printer. Typically one would not desire to include a bar code reader on a customer check-out station, however, it is advantageous to use the printer 52 for printing merchandise labels for special sales or when standard merchandise labels are defective or missing. In special sales situations, the bar code printer 52 is used to print special sales labels which are then applied to specially discounted items of merchandise to permit such items to be readily identified. Label printing for merchandise items may also be performed in line with general merchandise restocking operations. The bar code printer 52, consequently, serves to further expand the usefulness of the mobile customer service station 40.

The customer service stations 40 as shown schematically in FIG. 1 and pictorially in FIG. 2 are representative of a currently preferred embodiment of the invention. As can be seen, some of the above-described components of the customer service station 40 are mounted externally and are at least partially visible in the pictorial representation. FIGS. 1 and 2 show, for example, an antenna 55 of the radio transceiver 47, the cash drawer 43, and the multi-station printer 46. Other components, such as the battery 45 and the multi-function control unit 42 are mounted within a housing or an enclosure 56 of the console 41. The enclosure 56 is mounted, in turn, to a wheeled base or chassis 57 which serves as a component mounting structure of the console 41 of the customer service station 40.

The enclosure 56 desirably houses such electrical components that are desirably not accessible and supports other components of the customer service station which need to be accessed or be otherwise exposed. For example, because the transceiver need not be accessed by an operator, yet the antenna 55 desirably remains exposed for optimum functional range. Thus in the currently preferred arrangement of the various components of the mobile customer service station 40, the transceiver 47 is visible only by its antenna 55. The multi-station printer 46 is preferably placed on top of the enclosure 56 for ready access by a clerk. The cash drawer 43 is accessible and mounted to slide open horizontally. Other components, such as the battery 45 and the multi-function control unit 42 are housed within the enclosure 56 and are consequently not visible. Wheels 58 allow the customer service station 40 to be readily moved about by pushing or pulling it. It should be understood that various changes and modifications particularly in the placement of the components are possible without departure from the spirit and scope of the invention. Also, while it is deemed possible within the scope of the invention to apply power to the wheels 58 and thereby provide a self-propelled unit, these modifications are not contemplated at this time.

Figure 5:
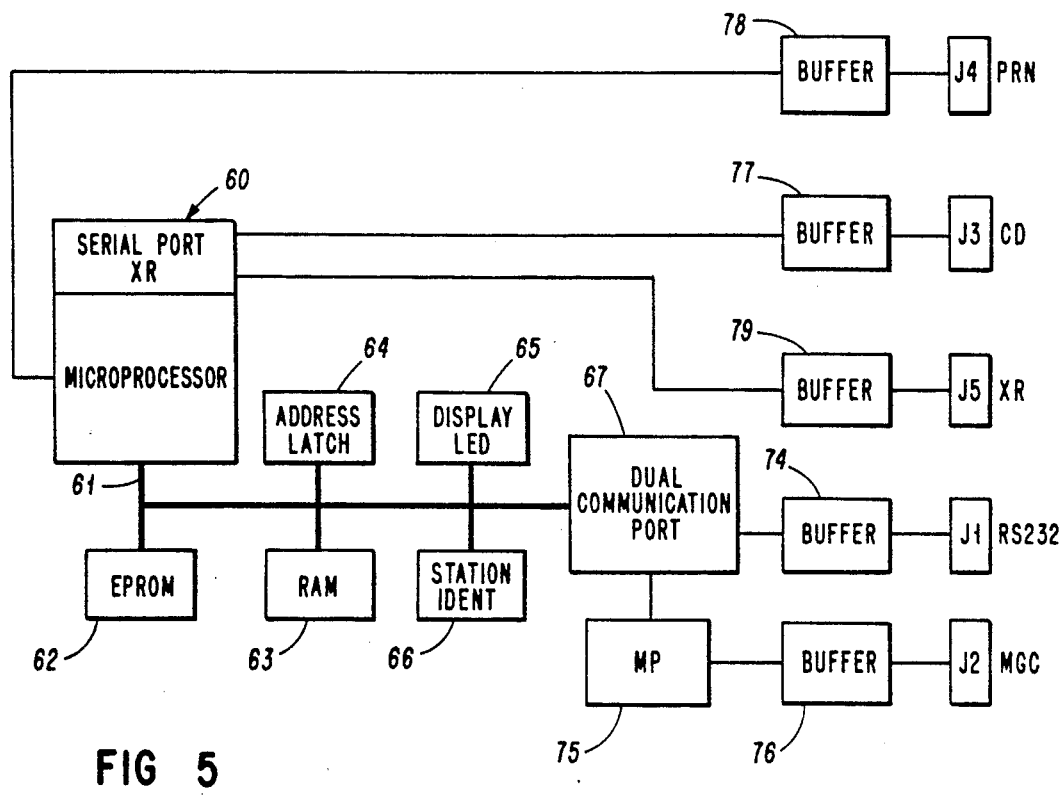
FIG. 5 is a schematic block diagram of a multi-function control unit shown in FIGS. 3 and 4.

FIG. 5 is a schematic block diagram of electrical control circuits which implement the functions supported by the multi-function control unit 42. In essence, the multi-function control unit serves the major functions of controlling the operation of the components of the customer service station 40, and providing radio communications with the communications controller 31.

A microprocessor 60 is shown to interact with several functional subcircuits via a control and data communications bus 61. As is often the case, the microprocessor interacts with an EPROM 62 (an electrically programmable read only memory) and a RAM 63 (a random access memory) in a typical manner. The EPROM 62 is initially programmed to store a control program to be accessed by the microprocessor 60. The control program causes the microprocessor to generate control codes in a predetermined manner to control all functions to be exercised by the customer service station 40. Thus, the program stored in the EPROM 62 establishes sequences and priorities between different operating functions known as a controller protocol. The RAM 63 temporarily stores data, which data may be either procedural or substantive. Procedural data are address codes, status information on a currently active component of the customer service station, or information indicating operating sequences. Substantive data are, for example, data concerning customer information, SKU numbers of purchases made by a respective customer, and price and quantity information.

An ADDRESS LATCH 64 latches or locks in the address of a current memory address.

A status display 65 is an LED indicator, preferably showing four digits, which indicates visually an alphanumeric status report of the operation of the customer service station 40. Thus, an operator may receive a trouble report in case of a malfunction. In a normal mode the currently active component of the customer service station 40 may be indicated.

A station identifier circuit 66 generates a code which, when incorporated into a time-slot encoded radio transmission data message, identifies which particular customer service station 40 has originated a particular radio transmission data message in question.

A dual communications port 67 is a serial communications port. The communications port temporarily stores data in data registers for transfer as a data stream into a serial interface, or the port 67 receives data in serial format and stores such data temporarily in such data registers for immediately subsequent data transfer to the microprocessor 60, for example.

The multi-function control unit 42 includes in its preferred embodiment, as shown in the schematic diagram of FIG. 5, five electrical connectors which serve as external connections or interface ports between the control unit 42 and the respective component as pointed out herein below.

The connectors are labeled J1 through J5. The connector J1 is a general purpose serial interface, generally known as an RS232 port. The J1 connector is in essence an auxiliary port, in that the preferred embodiment of the customer service station per FIG. 3 shows no connection with respect to the connector J1. However, the display 50 or, in the alternative, the bar code printer 52 is contemplated to be connected to the serial port J1. Data communication between the dual communication port 67 and any device externally connected to the connector J1 is buffered through a typical buffer circuit 74.

The connector J2 establishes a connection between the magnetic card reader 44 and the multi-function control unit 42. In reference to FIG. 5, the data received from the card reader 44 are raw data and are interpreted by a programmed microprocessor 75 in combination with a data buffer 76. The interpreted data are then applied to the dual communication port 67.

The connector J3 is the interface for the cash drawer 43. A command to open the cash drawer is issued directly from the microprocessor 60 as a result of a respective data message received thereby. An amplifier-driver circuit 77, also referred to as a buffer, adapts the signal from the microprocessor 60 to be recognized by the cash drawer 43.

The connector J4 is a printer interface and is matched to a parallel interface of the preferred multi-station printer 46. The data and hand-shake signals are applied by the microprocessor 60 to a buffer 78 and from there directly to the connector J4.

The connector J5 is a mating communications connector for the connector 48 and is preferably disposed to readily permit the radio transceiver 47 to be interconnected with the multi-function control unit 42. The connector J5 is hence the port to the radio communications system 21 as shown in FIG. 1. The diagram of FIG. 5 shows the microprocessor 60 as supporting serial transmit-receive functions. The microprocessor 60 provides through the respective serial XR input-output terminals the coding and decoding functions for the time-slot multiplexing procedure referred to above. Because of critical timing relationships, the encoding and decoding functions are preferred to be performed directly by the microprocessor. The signal generated by the microprocessor 60 is then transferred through a single buffer 79 and through the connector J5 to the radio transceiver 47. All transmissions received by or transmitted from the mobile customer service station 40 are, consequently, encoded to uniquely identify the particular data in such radio data messages with a particularly coded terminal 33.

Thus, to infuse one or more of the mobile customer service stations 40 into the radio communications system 21, a corresponding number of the potentially addressable data terminals 33 are deactivated and the respective customer service stations 40 are substituted to take the place of the deactivated data terminals 33. To establish correct identification of the respective customer service stations 40, each of the multi-function control units 42 must have stored the address code that corresponds to the address code of one of the deactivated data terminals 33.

From the above-described method of substituting the customer service stations 40 it becomes apparent that the number of substitutions cannot exceed the maximum number of available radio address codes within any given system. Thus, within the described limits of the preferred system, the maximum number of substituted customer service terminals would be sixteen.

In accordance with a preferred method of using the mobile customer service stations 40 as mobile stations of the transaction control system 10, a preferred number of substitutions of customer service stations 40 for what would otherwise be radio addresses for the data terminals 33 is less than the total possible number of substitutions for the following reasons.

In accordance herewith, the data terminals 33 are considered data entry terminals for the mobile customer service stations 40. To achieve such mode of operation, the communications protocol lodged in the central computer 11 can be modified to establish communication between a respective one of the data terminals 33 and one of the mobile customer service stations. A number of operational variations will be discussed below which affect the operational sequence and hence the protocol in the computer.

Figure 6:
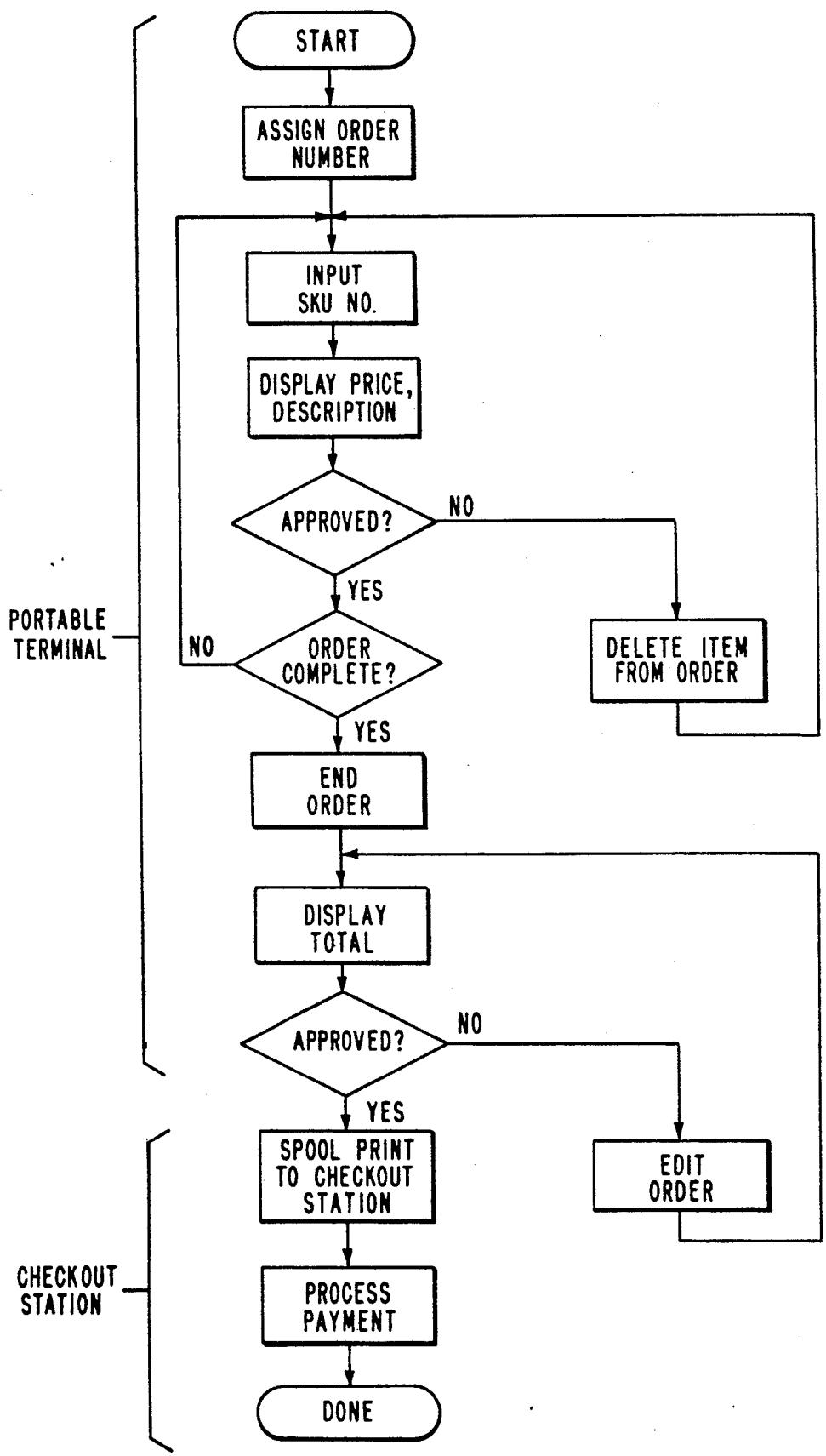
FIG. 6 is a flow diagram of one of a number of control sequences that may be followed by the system and the multi-function control unit of FIG. 5 as an example of a method of operation in accordance with the invention.

One basic mode of operation is best described in reference to the flow chart shown in FIG. 6, which relates to a transaction sequence in which a customer approaches a service clerk with the intent of consummating merchandise purchases. The service clerk is in possession of one of the data terminals 33. Upon initial contact with the customer the service clerk assigns a temporary order number. This may be performed in any of a number of ways. For example each of a number of service clerks may have assigned to them a specific employee number, such that the entry of the number immediately identifies the particular employee who is providing the service. Of course, the particular data terminal is uniquely identified by the central computer. Consequently, another procedure by which a number assignment may be made is a direct assignment as the result of the data terminal signing on. Such initial sign-on triggers the computer to open a file, hence to assign a temporary order number, as indicated by the step ASSIGN ORDER NUMBER. Thus the order number is transmitted to or generated by the central computer 11 or HOST, as indicated in the flow diagram.

The service clerk now enters the first merchandise number, an SKU number, into the data terminal 33 and transmits the SKU number of the selected merchandise item to the central computer 11 (INPUT SKU NO.). The computer looks up the price and merchandise description in its memory 13 (See FIG. 1 for system references) and transmits the information to the data terminal 33 (DISPLAY PRICE, DESCRIPTION).

At this point the customer may make a decision. For example, the price may not meet the customer's expectations because of a missed date for a special sales price or because a certain size or color of an item is no longer available. The customer is in a position to choose the item or to decline it. This is indicated by the decisional step APPROVED?. If the item is not chosen, the purchase is not approved, the item is deleted from the order, hence from the temporary file that has been opened for the customer in the memory 13 of the computer 11, as indicated by the step DELETE ITEM FROM ORDER. If the customer chooses the selected item, hence approves its purchase, the service clerk may inquire with the customer whether another purchase is to be made (ORDER COMPLETE?). If another item is to be purchased, another selection is made and the SKU number is again entered and transmitted to the computer 11. The process is repeated through the ORDER COMPLETE? decisional step until the query can be answered in the affirmative. At that point the instruction END ORDER is transmitted to the host, the computer 11.

The computer 11 at this point interactively transmits the sum total of purchased items including taxes to the data terminal 33. The total is displayed on the digital readout 35 of the terminal 33, and the customer has again the choice to approve or disapprove the purchase. The customer may disapprove, for example, because the sum total exceeds credit limits or budgetary restraints. In case of non-approval the EDIT ORDER step allows for the deletion of an item and the display of the revised sum total. If the final purchase stands approved, the next step is to assign final processing to one of the customer service stations 40 as described herein above.

The final processing differs from processing a customer's purchases at a typical cash register. Referring, for example, to a typical check-out operation, the customer may have indicated to the service clerk the preferred manner in which payment is to be made, such as by credit card. A station number of a conveniently located mobile customer service station 40 is entered into the data terminal 33 and transmitted to the computer 11. The computer matches the temporary order number with the station number of the selected customer service station 40 and transmits the information to the customer service station 40. It is to be noted that the data terminal 33 is not directly linked to the customer service station 40, in that the radio transceiver 38 of the data terminal 33 is on an equal hierarchical level with the transceiver 47 of the customer service station 40. Both are by design unable to communicate with each other. However, the computer 11 provides the interactive communications interface for effectively linking the data terminal 33 to function as the input keyboard for the customer service station 40.

In one contemplated method of operation, the service clerk is in the position to enter the customer's name and transmit that information to the computer 11. This may be done, for example while another clerk processes another customer at the same customer service station 40 at which the current transaction will subsequently be completed. Thus, the service clerk does not require actual or direct access to the customer service station 40 to enter such preliminary customer information into the computer 11. The direct communication of customer data from the data terminal 33 to the computer 11 is of particular advantage if the customer has an approved line of credit with the store and the credit information can be checked against the current transaction without the need to step up to the customer service station 40. Thus, an often disliked and sometimes confusing congestion as is found at typical cash registers may be avoided.

As soon as the previous customer transaction by another service clerk is completed at the selected customer service station, the service clerk in the next current transaction will have service from the multi-station printer 46. The purchase receipt with or without a credit agreement is printed presented to the customer, for signature if a purchase has been made on credit. The merchandise is now either packed at a separate station or the customer service station 40 can be employed for such additional purpose. When either the financial record printing or both printing the receipt and wrapping the purchased items is completed, the work at the customer service station is done and the next customer can be processed.

It is readily seen that a per-customer processing time at the customer service station 40 is reduced with respect to that of typical point-of-sale registers, since the use of a single keyboard at the typical point-of-sale register is used for checking out merchandise items and verifying customer credit information. Thus even when point-of-sale check-out registers are coupled into a computer with the ability to total purchases ahead of the customer stepping to the register, the typical time consuming information taking and approval process at the register remains.

In reference to FIG. 1, various modes of operating the customer service stations 40 are contemplated. The mobility of the stations 40 offer a number of advantages, in that the stations 40 are readily moved about on a sales floor without the need for wiring changes or installation. A basic mode of operation is an augmentation of an existing point of sales system 23 which already uses the radio communications system 21 for inventory control functions. In the referred-to system having the capability of addressing a total of sixteen radio transceiver units 38, a substitution of four terminals 33 changes the radio communications system 21 to include a full complement of twelve data terminals 33 and four customer service stations 40, hence a ratio of three data terminals to each customer service station 40. While this number of substitution is given as a convenient example, other ratios are certainly possible. An optimum ratio of data terminals 33 to mobile customer service stations 40 is recognized as depending on the particular merchandizing environment. While the use of a number of data terminals 33 exceeding the number of customer service stations is seen as advantageous for many check-out operations, using the same number of customer service stations 40 as there are data terminals 33 is within the scope of the invention. In fact, one may also substitute and use a number of customer service stations 40 which exceeds the number of active data terminals 33. The flexibility of the system 10 as described herein is seen as an advantage and benefit of the current invention. The described flexibility of the transaction control system 10 is seen furthermore as being particularly useful during seasonal peak demands during which additional customer check-out terminals or facilities may be needed and wiring installations are not deemed feasible.

Another application for use of the customer service stations 40 is a temporary location from which complex wiring for connections to a central computer 11 is not feasible, such as a tent, garden or warehouse sale. In such an area there are typically no provisions for coupling a sales terminal to a central computer 11. A proper wiring installation for computer-controlled check-out facilities would frequently not be feasible. In addition to the cost of installing electrical wiring, time factors involved in making wiring installations severely hampers the intent of installing a customer service terminal quickly in response to a present demand. On the other hand, the mobile customer service station 40 is readily moved to the desired location. If the placement of the terminal 40 is in the general area and range of the permanent installation of the radio communications system 21, then no relay station or electrical wiring installation is required. As an alternative, for unusually remote locations, a single one of the hard-wire cables 20 may be needed to simply locate the communications controller 31 and the base transmitter station 32 into the general locale in which a plurality of the customer service stations are to be used.

Using a plurality of the data terminals 33 for keying in information to each mobile customer service station 40 potentially reduces the check-out time per customer at the station to about one third of that required at a full check-out station. The contemplated use of the data terminal 33 in combination with the mobile customer service station 40 consequently not only provides a check-out station that improves customer service but also enhances the usefulness of the data terminals 33 to their owners.

A further application for the customer service stations 40 is at a trade fair or exhibition, particularly at one at which a number of commonly controlled sales areas are located in different parts of a fair grounds. In such event the computer can maintain accurate central control over all sales areas.

Particularly in this latter example, the system is intended to function not as an augmentation to an existing stationary point-of-sale system, but as an independently functioning mobile customer service system.

It is to be understood that various changes and modifications can be made to alter the specifically described structure or methods of operation of the preferred embodiment without departing from the spirit and scope of the invention. This invention is to be defined only by the scope of the claims appended hereto.

What is claimed is:

1. A transaction control system comprising:
    at least one portable data terminal, such data terminal including means for entering and for transmitting uniquely identifiable data and data messages relating to customer transactions;
    at least one mobile customer service station, said service station including a self-contained power source, a printer for printing customer transaction records and means for receiving uniquely addressed data and data messages;
    a wireless communications station including means for individually polling and addressing a plurality of such portable data terminals and mobile customer service stations and for transmitting to such data terminals and customer service stations said uniquely addressed data and data messages and for receiving from such customer service stations and data terminals said uniquely identifiable data and data messages; and
    a computer, said computer being communicatively interconnected with said wireless communications station for transfer of said uniquely identifiable data and data messages, including means for uniquely addressing any of such uniquely identifiable data and data messages for transfer to and transmission by said wireless communications system to any one and any selected ones of said at least one portable data terminal and said at least one mobile customer service station, means for initiating such transfer to receive from such wireless communications station said uniquely identifiable data and data messages relating to customer transactions from any one such data terminal, means for encoding said uniquely identifiable transaction data and data messages with a unique address for transfer to and transmission by said wireless communications station to said at least one mobile customer service station having such unique address and means for directing such customer service station to print a record of such customer transaction.

2. A transaction control system according to claim 1, wherein said at least one portable data terminal comprises a transceiver including coding, decoding, transmitting and receiving circuits, and wherein said coding and transmitting circuits of said portable data terminal transceiver are included in said means for transmitting data and data messages, and wherein said at least one mobile customer service station comprises a transceiver including coding, decoding, transmitting and receiving circuits, and wherein said decoding and receiving circuits of said mobile customer service station transceiver are included in said means for receiving data and data messages.

3. A transaction control system according to claim 2, wherein said at least one data terminal is a first plurality of data terminals, and wherein the number of said data terminals in said first plurality of data terminals is greater than said at least one mobile customer service station.

4. A transaction control system according to claim 2, wherein said at least one data terminal is a first plurality of data terminals, and wherein a ratio of the number of such data terminals in such first plurality of data terminals to said at least one mobile customer service station is a ratio of at least 2 to 1.

5. A transaction control system according to claim 2, wherein said at least one mobile customer service station further includes a control unit, said control unit including said coding and decoding circuits of said mobile customer service station transceiver, said control unit further including a first communications connector and means for coupling said coding and decoding circuits of said mobile customer service station to said communications connector, and wherein said transmitting and receiving circuits of said mobile customer service station are mounted in a housing, said housing including a connector matched to interconnect with the first communications connector of said control unit, and means for coupling said transmitting and receiving circuits of said mobile customer service station to said housing connector, such that upon interconnection of said housing and first communications connectors, said coding and decoding circuits of said mobile customer service station and said transmitting and receiving circuits of said mobile customer service station are communicatively interconnected.

6. A transaction control system according to claim 2, wherein said at least one mobile customer service station further comprises:
   a magnetic card reader for reading data from a customer's credit card; and
   a control unit communicatively coupled to the printer, the magnetic card reader, and the transceiver in said mobile customer service station, said control unit including means for controlling the operation of the printer, the magnetic card reader and the transceiver in said mobile customer service station, means for receiving data and data messages from the magnetic card reader and from the transceiver in said mobile customer service station, and means for transferring data and data messages to the transceiver in said mobile customer service station.

7. A transaction control system according to claim 6, wherein said at least one mobile customer service station further comprises:
   a cash drawer, said cash drawer including an operating circuit operable to open said cash drawer upon receipt of a cash drawer control signal, said operating circuit being communicatively coupled to said control unit; and
   means, included within said control unit, for sending the cash drawer control signal to said operating circuit of said cash drawer.

8. A transaction control system according to claim 7, wherein said at least one mobile customer service station further comprises:
   a digital display, comprising means for receiving and storing digital data and messages for display;
   a data input device coupled to said display for acquiring data in digital format for transfer to said display; and
   means for communicatively coupling said display to said control unit for transferring data between said display and said control unit, said coupling and transferring means including coding of data transferred from such display and transmission of such coded data to said computer.

9. A transaction control system according to claim 8, wherein said data input device is a keyboard having a plurality of alphanumeric input keys for entering data and data messages into said display, and including a prompt means for causing the transfer of such entered data to said control unit.

10. A customer service station for communication with at least one portable data terminal via a radio communication system, said system including a computer coupled to said system, comprising:
   a printer for printing a customer transaction record;
   a uniquely identifiable wireless transceiver, said transceiver including circuit means for coding and transmitting data and data messages uniquely identifiable by said radio communications system as having originated from said transceiver, and for receiving and decoding data and data messages from said at least one portable data terminal uniquely addressed for being decoded solely by said transceiver by the computer coupled to said radio communications system;
   means for transferring decoded data and data messages from said transceiver to said printer for printing a record of said data and data messages;
   a self-contained power source; and
   means for coupling said power source to said printer, to said wireless transceiver and to said transfer means, whereby said printer, said wireless transceiver, said transfer means and said self-contained power source are collectively mobile for infusion at a preselected location into said radio communications system to co-operate with said at least one portable data terminal and said radio communications system as a customer transaction control system wherein data and data messages from said at least one portable data terminal uniquely addressed to said wireless transceiver by said radio communication system comprise information for printing a customer transaction record.

11. A customer service station according to claim 10, the station further comprising:
   a magnetic card reader; and
   a control unit, said control unit electrically coupled to said power source and including said power source coupling means, said coding and decoding circuit means of said transceiver and said means for transferring, and further including means for interpreting data read by said magnetic card reader from a credit card, and means for storing data and data messages including such interpreted data from said magnetic card reader; and
   means for communicatively coupling said magnetic card reader to said control unit to transfer data from the magnetic card reader to the control unit, whereby data read by the magnetic card reader can be coded and transferred within said transaction control system.

12. A customer service station according to claim 11, the station further comprising:
   a cash drawer, said cash drawer including an operating circuit operable to open said cash drawer upon receipt of a cash drawer control signal, said operating circuit being communicatively coupled to said control unit; and
   means, included within said control unit, for sending the cash drawer control signal to said operating circuit of said cash drawer.

13. A customer service station according to claim 11, the station further comprising:
   a digital display, comprising means for receiving and storing digital data and messages for display;
   a data input device coupled to said display for acquiring data in digital format for transfer to said display; and means for communicatively coupling said display to said control unit for transferring data between said display and said control unit, said coupling and transferring means including coding of data transferred from such display and transmission of such coded data to said computer.

14. A customer service station according to claim 13, wherein said data input device is a keyboard having a plurality of alphanumeric input keys for entering data and data messages into said display, and including a prompt means for causing the transfer of such entered data to said control unit.

15. A customer service station according to claim 14, the station further comprising:
a bar code reader electrically and communicatively coupled to said control unit to receive data from such control unit.

16. A customer service station according to claim 13, the station further comprising:
a bar code reader electrically and communicatively coupled to said control unit to receive data from such control unit.

17. A customer service station according to claim 11, wherein the printer is a multi-station printer including a first printing station for printing a sales receipt to be presented to a customer and a credit card charge slip to be signed by the customer, and a second printing station for generating a printed transaction log.

18. A customer service station according to claim 11, the station further comprising:
a bar code reader electrically and communicatively coupled to said control unit to receive data from such control unit.

19. A customer service station according to claim 11, the station further comprising:
a base including a component mounting structure;
a plurality of wheels mounted to and supporting said base; and
an enclosure mounted to and supported by said base, said enclosure housing said power source and said control unit, and supporting said printer and said card reader.

* * * * *